Nov. 21, 1933.   F. A. PESCHL   1,936,117
VARIABLE SPEED POWER TRANSMITTING MECHANISM
Filed July 7, 1927   5 Sheets-Sheet 1
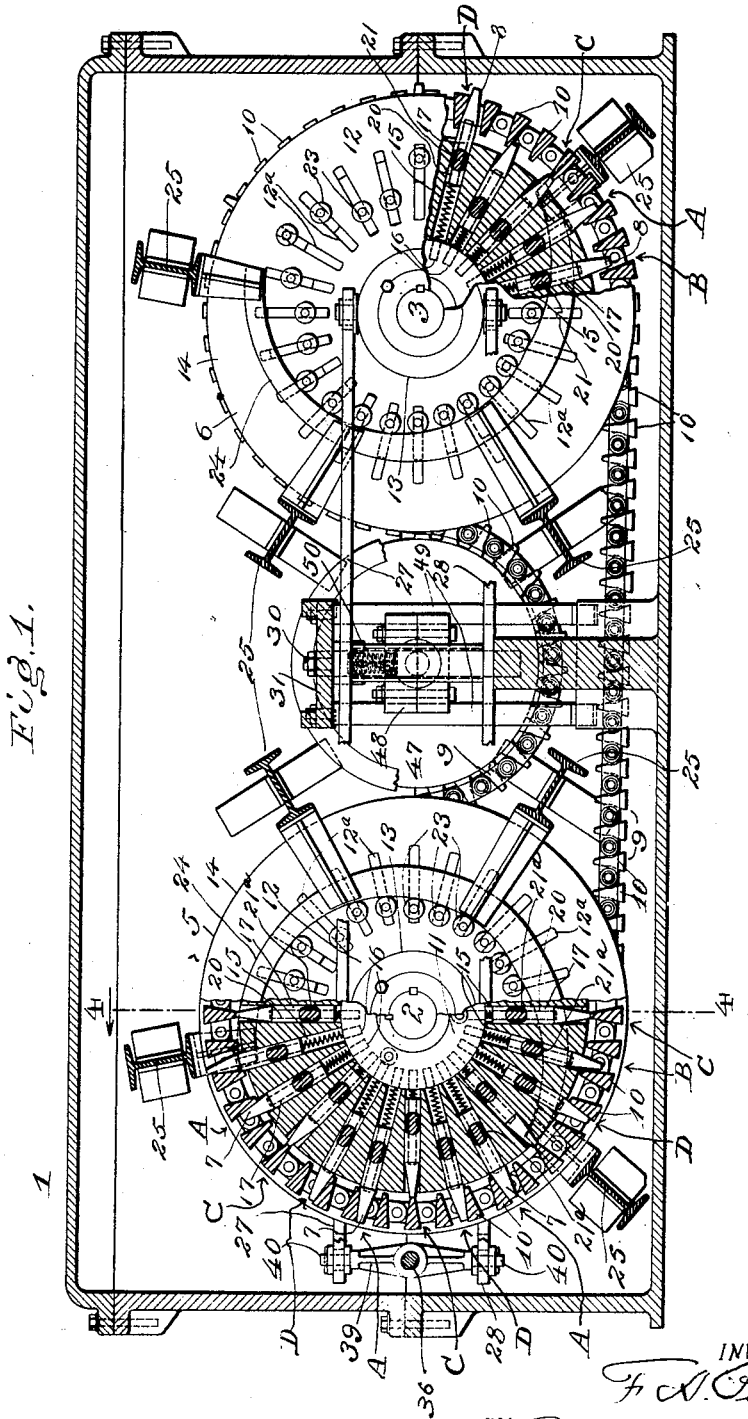
INVENTOR.
F. A. Peschl
BY Rogers, Kennedy Campbell
ATTORNEYS Nov. 21, 1933. F. A. PESCHL 1,936,117
VARIABLE SPEED POWER TRANSMITTING MECHANISM
Filed July 7, 1927 5 Sheets-Sheet 2
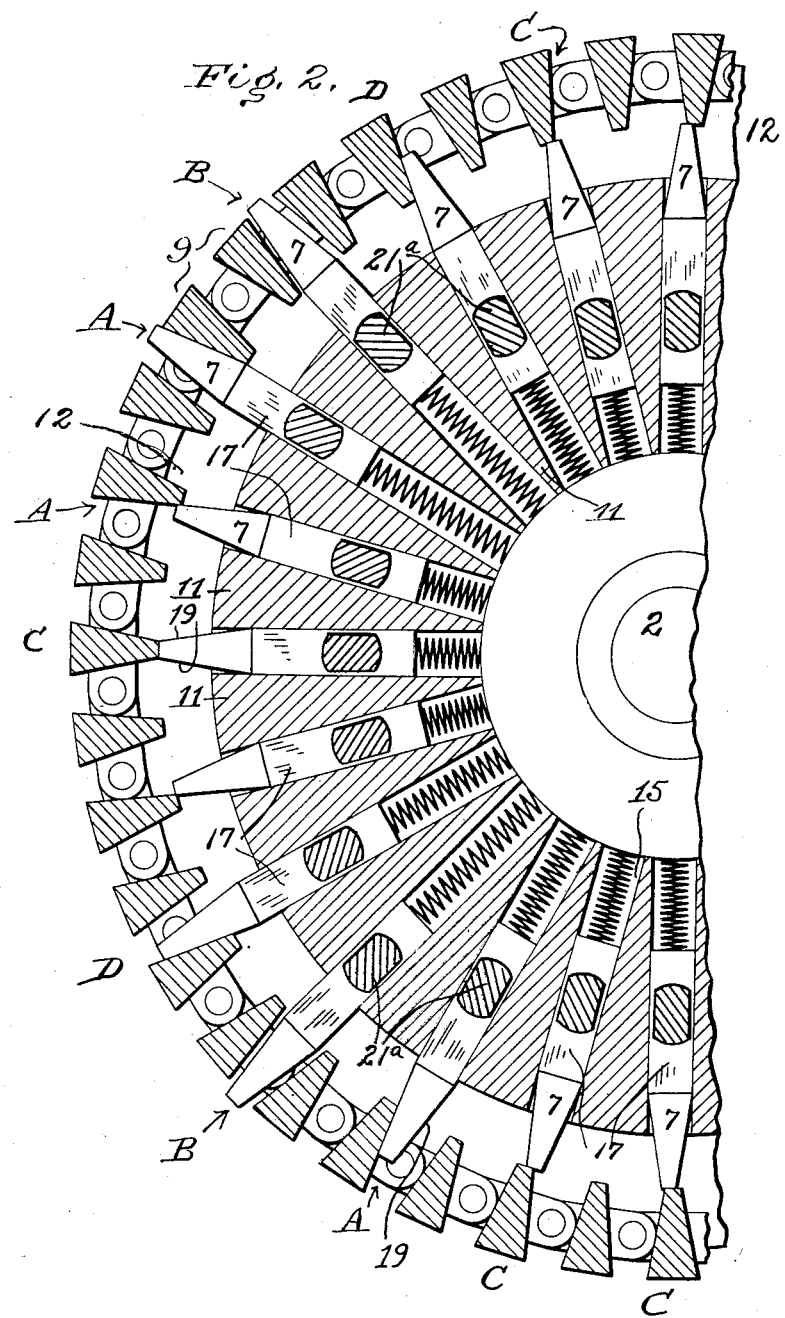
INVENTOR.
F. A. Peschl
BY Rogers, Kennedy Campbell
ATTORNEYS.

Nov. 21, 1933.  F. A. PESCHL  1,936,117
VARIABLE SPEED POWER TRANSMITTING MECHANISM
Filed July 7, 1927  5 Sheets-Sheet 3
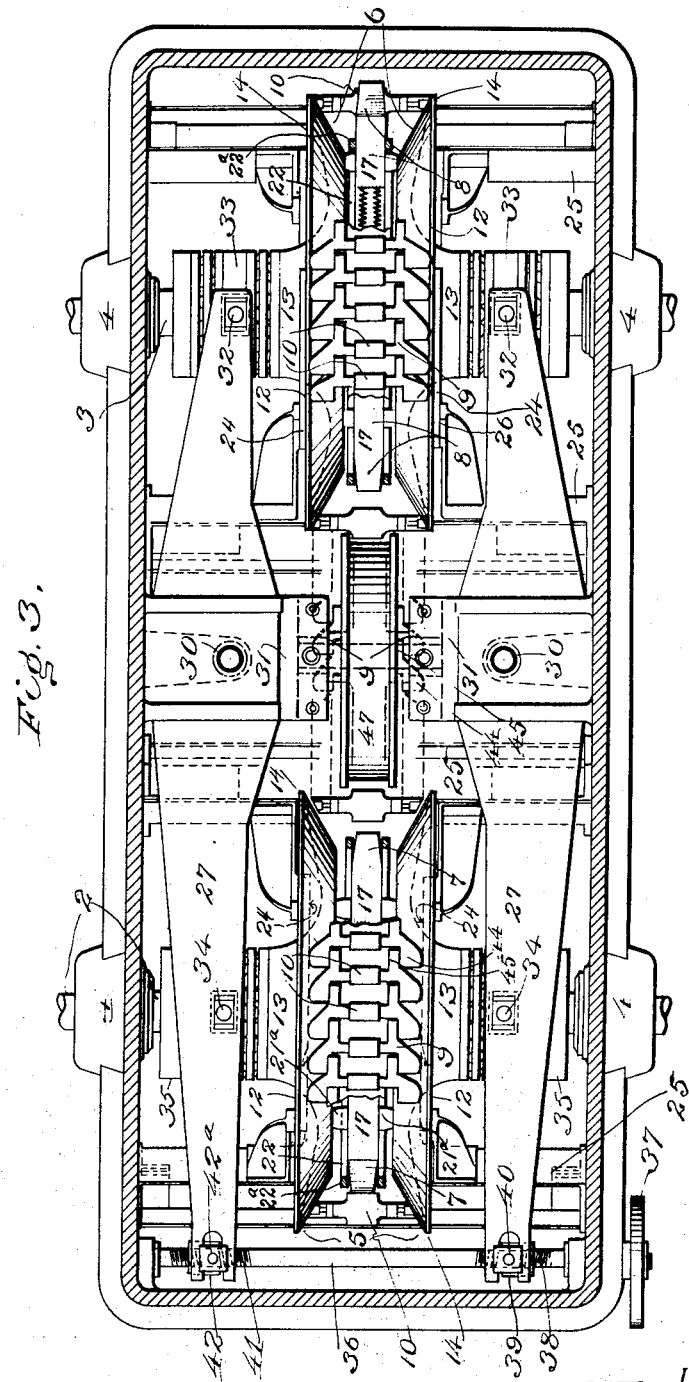
INVENTOR.
F. A. Peschl
BY Rogers, Kennedy Campbell
ATTORNEYS

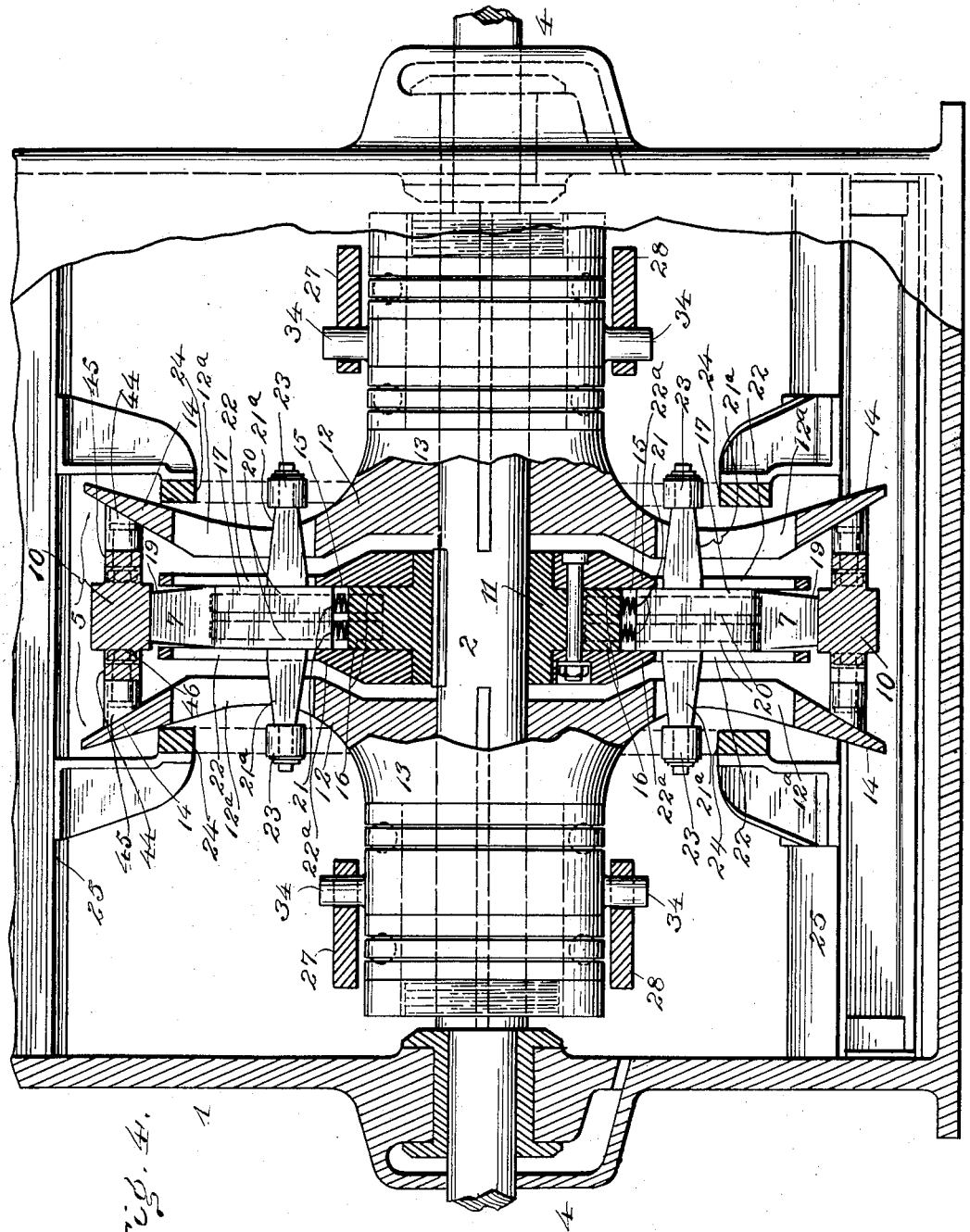

Nov. 21, 1933.  F. A. PESCHL  1,936,117
VARIABLE SPEED POWER TRANSMITTING MECHANISM
Filed July 7, 1927  5 Sheets-Sheet 5
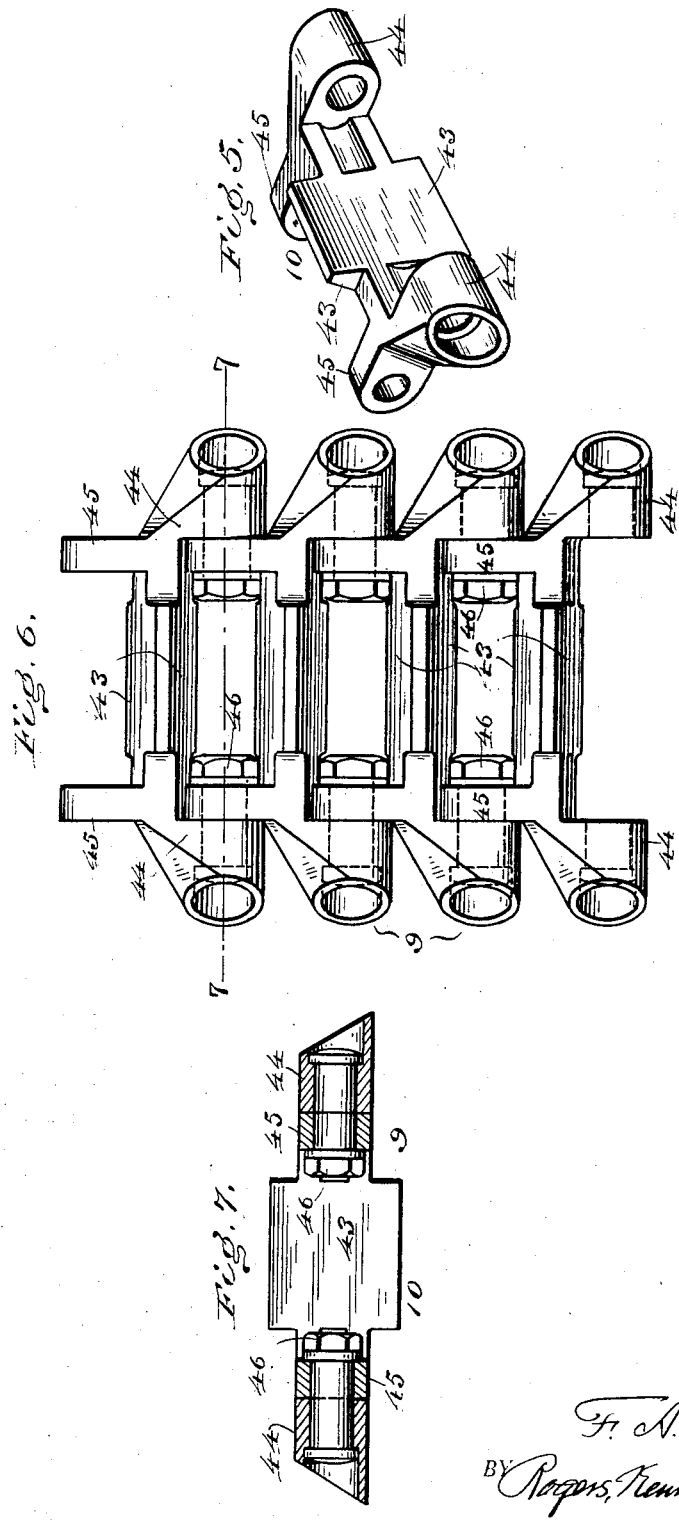
INVENTOR.
F. A. Peschl
BY Rogers, Kennedy Campbell
ATTORNEYS.

Patented Nov. 21, 1933

1,936,117

UNITED STATES PATENT OFFICE 1,936,117

VARIABLE-SPEED POWER-TRANSMITTING MECHANISM

Frank A. Peschl, Jackson Heights, N. Y.

Application July 7, 1927. Serial No. 203,914

21 Claims. (Cl. 64—8)

This invention relates to that type of variable-speed driving and power transmitting mechanism in which driving and driven pulleys variable in effective diameters are connected by an endless power transmitting belt or chain, by means of which the motion of one pulley may be transmitted to the other at different predetermined speed ratios. The object of the invention is to provide for the positive transmission of the rotary motion from one pulley to the other in the different relative effective diameters to which the pulleys may be adjusted, and the invention in its broader aspects consists of the combination with a rotary driving pulley, a rotary driven pulley, driving teeth carried by said pulleys, and means for varying the effective diameter of one pulley relative to the other, of a power transmitting chain surrounding the pulleys, driving teeth carried by the chain and adapted to engage at their sides with the sides of certain of the pulley teeth, the teeth of one of said sets being movable relative to their carrier transversely of the direction of travel of the carrier for engagement with the teeth of the other set, and being held from other movement relative to their carrier, and the engaging faces of said teeth being in a common plane disposed at an inclination to the line of relative movement of the movable teeth; whereby under the different relative adjustments of the effective diameters of the pulleys, one or more of the teeth of the two sets will engage with each other and the motion of the driving pulley will be positively transmitted to the power transmitting chain, and the motion of the latter will be positively transmitted to the driven pulley.

In the more specific form of the invention, the two pulleys comprise each a central body portion keyed to a carrying shaft and provided with radially movable teeth urged outwardly by springs, and two disk-like members or flanges formed with sloping adjacent faces and splined to the shaft on opposite sides of the central body portion and movable to and from each other to vary the effective diameters of the pulleys, and an endless chain surrounding the body portion of the pulleys between the sloping faces of the flanges and provided with teeth, the side faces of which are adapted to cooperate with the side faces of the pulley teeth in receiving motion from the driving pulley and transmitting the same to the driven pulley, the engaging faces of said teeth in respect to each pair extending in a common plane, which planes are disposed at an inclination to the line of movement of the pulley teeth, or in other words at an inclination to a line normal to the pitch circle. It is preferable in the above described relation of parts, that the pitch of the toothed chain be so selected with relation to the number of pulley teeth, that at one time at least one of the teeth of each pulley will be engaged partially or wholly with its corresponding chain tooth at any of the different diameters to which the pulleys may be adjusted.

While in the foregoing outline of the characteristics of the improved mechanism the movable teeth are described as being carried by the pulleys, it will be manifest that these teeth may without departure from the spirit of the invention, be mounted on the chain to cooperate with teeth on the pulley, since in such reversed arrangement of the parts, the functional operation of the chain and pulleys will be unaffected, insofar as the variations of speed of the driven pulley as transmitted positively by the driving pulley are concerned.

In the specification to follow the invention will be described in detail, and the novel features thereof will be pointed out in the appended claims.

In the accompanying drawings:

Fig. 1 is a vertical longitudinal sectional elevation through my improved power transmitting mechanism.

Fig. 2 is a fragmentary view in section of the driving pulley, showing the same adjusted to a different diameter from that shown in Fig. 1.

Fig. 3 is a top plan view of the mechanism.

Fig. 4 is a vertical transverse section on the line 4—4 of Fig. 1.

Fig. 5 is a perspective view on an enlarged scale of one of the links of the toothed endless chain of the mechanism.

Fig. 6 is a plan view of a number of the links of Fig. 5 jointed together.

Fig. 7 is a cross section through the same on the line 7—7 of Fig. 6.

Referring to the drawings:

The operative parts of the mechanism are enclosed in a box-like casing or housing 1, in the side walls of which a horizontal driving shaft 2 and a horizontal driven shaft 3 are journaled in suitable bearings 4, the driving shaft being adapted to be driven from any suitable source of power, and the driven shaft being adapted to be connected up with the mechanism or device or other part to be driven.

A driving pulley 5 is mounted on and rotatable with the driving shaft 2, and a driven pulley 6 is mounted on and rotatable with the driven shaft 3, which pulleys are provided respectively with driving teeth 7 and 8; and an endless chain 9 provided with driving teeth 10 to cooperate with the teeth on the pulleys, passes around said pulleys and serves to transmit the rotary motion from the driving pulley to the driven pulley.

The driving pulley 5 consists of a central disk-like body portion 11 keyed to the shaft 2, and two disk-like members or flanges 12, arranged at opposite sides of the body portion and provided with hubs 13, splined to the shaft, the inner sides of said flanges near their peripheral edges being sloped outwardly in opposite directions as at 14 and forming inwardly sloping bearing surfaces for the sides of the chains, whereby by adjusting the disk-like flanges 12 to and from each other in the manner presently to be described, the chain will be given a seat on the pulley nearer to or farther from its axis as the case may be, and the effective diameter of the pulley engaged by the chain will therefore be varied.

The central body portion 11 is formed with a series of radial recesses 15 which extend inwardly from the periphery of the body portion to points some distance from the center, the bottoms of the several recesses being formed each with a pair of cavities 16, and a series of slides 17 are mounted in the radial recesses to reciprocate therein, the said slides terminate at their outer ends in the driving teeth 7 before alluded to, which teeth are wedge-shaped and formed with sloping side faces 19 converging toward each other from their bases. The slides are formed with pairs of cavities 20 in line with the respective pairs of cavities 16, and spiral springs 21 are seated in the aligned cavities and tend to urge the slides, and consequently the driving teeth thereon, outwardly, while permitting the teeth to yield inwardly when their outer ends are subjected to inward pressure, the teeth while being thus movable radially of the pulley, are held in fixed relation circumferentially thereof.

Arms 21ª extend horizontally outwardly in opposite directions from the outer sides of the respective slides and loosely through radial slots 22 formed in disks 22ª fastened to the opposite sides of the body portion 11 and through radial slots 12ª in the two disk-like flanges 12, the ends of the slots 22 acting as stops to limit the reciprocating motion of the slides; and the other ends of said arms have rollers 23 journaled thereon and adapted in the rotation of the pulley to engage with curved cam tracks 24 fixedly supported at the outer sides of the flanges 12 by means of I-beams 25 fixed to and extending between the side walls of the housing 1; whereby the teeth of the pulley will be automatically retracted at the inner peripheral side of the pulley for the purpose presently to be described.

The driven pulley 6 is of the identical form of the driving pulley just described, and the corresponding parts thereof have been given the same reference numerals as those applied to the driving pulley.

As before stated, the effective diameters of the pulleys are varied by adjusting the disk-like flanges 12 of the respective pulleys to and from each other, the movement of the flanges toward each other causing the chain to seat on the pulley at a greater distance from its axis and therefore increasing its effective diameter, and the movement of the flanges away from each other causing the chain to seat closer to the axis and therefore decreasing the effective diameter, and in order to vary the ratio of speed of the pulleys, the increase of diameter of one pulley is preferably, and as shown in the drawings, effected simultaneously with the decrease of the diameter of the other pulley in accordance with the practice observed in connection with the variable power transmitting mechanisms of this general type.

In order to effect such relative adjustments of the pulleys, upper and lower longitudinally extending rocker bars 27 and 28 are pivoted midway between their ends on opposite sides of the two pulleys on vertical studs 30 supported by standards 31 extending upwardly from the bottom of the housing at points midway between the two shafts 2 and 3. The ends of said bars adjacent the driven shaft 3 are journaled respectively on upper and lower studs 32 extending outwardly at diametrically opposite points from sleeves 33 mounted loosely on the respective hubs 13 of the disk-like flanges of the driven pulley, and near their opposite ends, said rocker bars are journaled respectively on upper and lower studs 34 extending outwardly at diametrically opposite points from sleeves 35 mounted loosely on the respective hubs 13 of the disk-like flanges of the driving pulley, the arrangement of the parts being such that by moving those ends of the rocker bars which are adjacent the driving pulley toward each other, the disk-like flanges of said pulley will be moved toward each other and the disk-like flanges of the driven pulley will be simultaneously moved away from each other, thereby increasing the effective diameter of the driving pulley and decreasing the effective diameter of the driven pulley; and by moving said ends of the rocker bars away from each other, the effective diameter of the driving pulley will be decreased and that of the driven pulley increased.

The rocker bars are moved to and from each other by means of a horizontal transversely extending shaft 36 mounted to rotate in bearings on the side walls of the housing 1 between the driving pulley and end wall of the housing as best shown in Fig. 3, the ends of the shaft terminating outside of the housing and having fixed thereon a hand wheel 37 for rotating it. Near its front end the shaft is formed with screw threads 38 engaging in a threaded hole in the center of a vertical yoke 39 provided on its opposite ends with studs 40 journaled respectively in the ends of the front rocker bars. Near its rear end the said shaft is formed with screw threads 41 of the opposite pitch to that of the threads 38, which threads are engaged in a threaded hole in the center of a vertical yoke 42 provided on its ends with studs 42ª journaled respectively in the ends of the rear rocker bars. As a result of this form and arrangement of the parts, when the shaft 36 is rotated in one direction, it will act to adjust the rocker bars so as to simultaneously move the disk-like flanges of the driving pulley away from each other and those of the driven pulley toward each other, and when rotated in the opposite direction the motion of the parts will be reversed; whereby the effective diameters of the two pulleys may be varied relatively, one increased and the other simultaneously decreased, and vice versa.

The power transmitting endless chain 9 before alluded to is made up of links of the individual form shown in Fig. 4, where it will be seen that the tooth 10 before alluded to extends transversely at the central portion of the link and is wedge-like in form, being provided with oppositely sloping or converging side faces 43. The link is formed at its opposite ends respectively with pairs of transversely spaced opposed ears or lugs 44 and 45, the ears 45 of one link being adapted to seat between the ears 44 of the adjacent link, which interfitting ears are pivoted together by pivoting bolts 46 as best shown in Fig. 7. The chain is applied to the pulleys with the smaller ends of the wedge-like teeth facing the smaller ends of the wedge-like teeth on the pulleys, the sloping sides of the chain teeth being of the same inclination as the sloping sides of the pulley teeth with which they cooperate, so as to operate on each other with a wedging effect. Between the pulleys it may be advisable to pass the chain beneath an idler tension roller 47 mounted in bearings 48 sliding vertically in guides 49 extending upwardly from the bottom of the housing and acted on by spiral springs 50 which tend to force the pulley down with yielding pressure; whereby the proper tension of the chain will be assured, and it will be caused to engage with the two pulleys for nearly their entire circumferential extent.

The outer ends of the lugs 44 on the chain links are beveled in opposite directions so as to converge toward each other to correspond to the converging sides 14 of the disk-like flanges of the pulley, whereby the flanges afford a seat for the chain, which seat by being widened or contracted as hereinbefore described, will vary the effective diameter of the pulley by allowing the chain to engage nearer to or farther from the axis of the pulley, it being understood that the increase in the effective diameter of one pulley being, in the example of the invention illustrated, coincident with a decrease in the effective diameter of the other pulley in like degree, the tension of the chain will remain unchanged.

The pitch of the toothed chain may be, and preferably is, so mathematically selected with reference to the number of pulley teeth and the different radial positions relative to the pulley which they may assume, that in the operation of the mechanism, one or more of the pulley teeth will engage partially or wholly at their sides with the sides of one or more of the chain teeth, without regard to the particular effective diameters to which the pulleys may be adjusted. These engaging faces of the two sets of teeth are in respect to each pair of teeth, disposed in a common plane, which planes, due to the sloping or wedge-shaped form of the teeth, will extend at an inclination to the line of relative movement of the movable teeth of the pairs; and as a result of this form and relation of the parts, the motion of the driving pulley will be transmitted to the chain in a positive manner, and the motion of the chain will in turn be transmitted in like manner to the driven pulley, and this action will take place under all of the different relative effective diameters to which the two pulleys may be adjusted.

In the operation of the parts, the springs 21 will push the pulley teeth out as far as they will go, and, according to the different effective diameters of the pulleys, the teeth will assume different relative positions. Some will be projected to a point where their flanks will engage flatly with the flanks of the chain teeth, as the series A in Fig. 1; some will extend between adjacent chain teeth without engaging either, as at B; some will abut at their outer extremities with the ends of the chain teeth, as the series C; and some will engage at their rear sides with the forward sides of the chain teeth, as the series D.

In the example of the invention shown in Fig. 1 where it will be assumed that the driving pulley is rotating clockwise, three of the pulley teeth are in positive driving engagement with three of the chain teeth, as the series A, the second tooth of the series being engaged for its full extent with the chain tooth, and the others engaged in lesser degree, the three engaging teeth affording far more driving engagement than in a strict sense is necessary to transmit the motion of the parts under conditions of actual practice. In the rotation of the pulleys therefore, the teeth thereon will automatically find their positions relative to the chain teeth, some as shown in driving engagement, and others in different degrees of projection and in different relations to the chain teeth; and back lash will be prevented since a certain number of the pulley teeth, the series D, will engage the unloaded side of the chain teeth. Wear on the teeth of the pulleys and chain will have no deranging or damaging effect on the proper functioning of the apparatus, since the springs behind the pulley teeth will act constantly to take up any play caused by wear.

While in the illustrated example of the apparatus described, springs are employed for yieldingly urging the movable teeth outwardly in their guiding recesses in the pulleys, other specific means may be employed for projecting the teeth, and such projecting means may be entirely omitted and dependence placed upon the action of centrifugal force in the rotation of the pulleys for forcing the teeth outwardly and causing them to take their proper relative positions to the chain teeth in the different adjustments of the effective diameters of the pulleys.

The cam tracks 24 before alluded to, act to positively withdraw the pulley teeth from engagement with the chain teeth before the chain leaves the pulleys, and these cams will keep the teeth withdrawn until the teeth in the rotation of the pulley arrive at the point where the returning stretch of the chain again engages the pulley as shown at the left at the bottom of Fig. 1, and to the right at the top. This automatic withdrawal of the pulley teeth relieves both sets of teeth from friction and from punishment of inaccurate engagement and disengagement when the chain engages and disengages the pulleys. The cams are preferably so designed that the release of the teeth at the point where the chain re-engages with the pulley, will not be abrupt but the teeth will be allowed gently to move outwardly, and the centrifugal force of the pulley teeth will be prevented from acting suddenly on the chain.

By a proper selection of the pitches and angles of the tooth flanks, a combination of these factors may be produced which will insure that a certain number of pulley and chain teeth will be engaged partially or wholly at the same time.

The angle between the tooth flank and the longitudinal axis of the tooth body is preferably less than the angle of repose of the maximum pull concentrated on one tooth. This maximum pull exists at the start of the machine where the starting chain pull is several times the running pull. The spring force acting on the tooth will of course allow the angle between the tooth flank and tooth body axis to be larger than that determined by the angle of repose alone. This greater angle is very desirable since it increases the possibility that more of the pulley and chain teeth will partially or entirely engage each other.

It is preferable to mount the operative parts in a housing partially filled with a suitable oil, so that there will be a continuous oil splash over the enclosed mechanism and the enclosing housing walls.

While in the drawings and foregoing description the variation of the relative speeds of the driving and driven pulleys is effected by a change in the effective diameter of both pulleys, the increase of diameter of one pulley being coincident with a decrease in like degree of the effective diameter of the other pulley, it will be understood that such variations of speed may be obtained by changing the effective diameter of one pulley without changing that of the other; or the change of diameter of one pulley may be in greater or in less degree than the change of diameter of the other pulley. In such case however there will be a tendency of the tension of the chain to vary with the unequal changes in the relative diameters, but this will be compensated for by the idler tension roller 47 which by bearing on the upper stretch of the chain with a yielding pressure, will act to take up the slack of the chain and will maintain the same in uniform tension under the conditions mentioned.

Having thus described my invention, what I claim is:

1. In a variable speed mechanism, the combination of a rotary driving pulley comprising a central body portion and two side members formed with sloping inner side faces and adjustable to and from each other to vary the effective diameter of the pulley, driving teeth carried by said body portion and movable outwardly and inwardly relatively thereto in fixed relation circumferentially of the body portion, a power transmitting chain formed with sloping side faces fitting between sloping faces of the pulley members, and driving teeth carried by the chain and adapted to cooperate with the pulley teeth, the front faces of the pulley teeth and the rear faces of the chain teeth being, when said teeth are in cooperative relation with each other, each in a common plane disposed at an inclination to the line of movement of the pulley teeth relative to the pulley to effect a positive engagement of said pulley and chain teeth by the outward movement of the pulley teeth different distances.

2. In a variable speed mechanism, the combination of a rotary driving pulley variable in effective diameter, driving teeth carried by said pulley and movable outwardly relatively thereto, arms extending outwardly from said teeth, an endless power transmitting chain passing around the pulley, teeth on the chain to cooperate with those on the pulley in receiving the drive of the latter, and fixed cam tracks at the sides of the pulley in position to be engaged by the arms on the teeth and operating to alternately retract said pulley teeth and permit their projection.

3. A variable speed mechanism comprising in combination, a rotary driving pulley, a rotary driven pulley, a set of driving teeth carried by said pulleys and movable inwardly and outwardly relative thereto in fixed relation circumferentially thereof, a power transmitting chain passing around and movable with said pulleys, a set of driving teeth carried by the chain and adapted to be cooperatively engaged by the pulley teeth in transmitting motion between the pulleys, with the engaging faces of the pulley teeth and the chain teeth extending in common planes disposed at an inclination to the line of relative movement of the pulley teeth, a positive engagement of the pulley teeth with the chain teeth being effected by the outward movement of the pulley teeth different distances, and means for varying the effective diameter of one pulley relative to the other.

4. A variable speed mechanism as in claim 3, characterized by the fact that the pitch of the tooth chain is such relative to the number of teeth on each pulley that at least one of the teeth of each pulley will be engaged partially or wholly with its corresponding chain tooth at any of the different diameters to which the pulleys may be adjusted.

5. A variable speed mechanism as in claim 3, characterized by the fact that the teeth of the two sets are wedge-shaped with the smaller ends of the teeth of one set facing the smaller ends of the teeth of the other set.

6. A variable speed mechanism as in claim 3, characterized by the fact that means are provided acting on the movable teeth to yieldingly project the same for engagement with the other teeth.

7. A variable speed mechanism as in claim 3 characterized by the fact that means are provided for automatically retracting the pulley teeth at or adjacent the point where the power transmitting chain disengages the pulley.

8. A variable speed mechanism as in claim 3 characterized by the fact that means are provided for automatically retracting the pulley teeth at or adjacent the point where the power transmitting chain disengages from the pulley, and means are provided for permitting the gradual projection of the retracted teeth at or adjacent the point where the transmitting chain engages with the pulley.

9. A variable speed mechanism as in claim 3 characterized by the fact that means are provided for retracting the movable teeth, which means is of a form which will hold the teeth retracted until they arrive at or adjacent the point where the chain engages the pulley, and then will release the teeth to permit their projection.

10. A variable speed mechanism as in claim 3 characterized by the fact that tooth retracting means are provided in the form of a fixed cam in position to be engaged by projections on the teeth as the latter are carried around with the pulleys.

11. A variable speed mechanism as in claim 3, characterized by the fact that springs are provided to act on the movable teeth to yieldingly project the same for engagement with the other teeth.

12. In a variable speed mechanism, the combination of a rotary driving pulley comprising a central body portion and two side members, one of which members is formed with a sloping inner face, and one of which members is adjustable to and from the other relative to the central body portion to vary the effective diameter of the pulley, driving teeth carried by said body portion and movable outwardly and inwardly relative thereto, a power transmitting chain fitting between the said pulley members and formed with sloping side faces engaging the said sloping side face of the pulley member, and driving teeth carried by the chain and adapted to cooperate with the pulley teeth in the transmission of the motion of the pulley to the chain, said pulley teeth and chain teeth being formed to match for positive engagement with one another effected by the outward movement of the pulley teeth different distances.

13. In a variable speed mechanism, the combination of a rotary driving pulley comprising a central body portion and two side members formed with sloping inner side faces and adjustable to and from each other relative to the central body portion to vary the effective diameter of the pulley, driving teeth carried by said driving portion and movable outwardly and inwardly relative thereto, a power transmitting chain formed at opposite sides with sloping side faces fitting between the sloping faces of said pulley members, and driving teeth carried by the chain and adapted to cooperate with the pulley teeth in the transmission of the motion of the pulley to the chain, said pulley teeth and chain teeth being formed to match for positive engagement with one another effected by the outward movement of the pulley teeth different distances.

14. A variable speed mechanism comprising in combination a rotary driving pulley, a rotary driven pulley, each of said pulleys comprising a central body portion and two side members, one of which members of each pulley is formed with a sloping inner face, and one of which members of each pulley is adjustable to and from its companion member relative to its central body portion to vary the effective diameter of the pulley, a set of driving teeth carried by each of said body portions and movable outwardly and inwardly relative thereto, a power transmitting chain passing around said pulleys between the side members thereof, said chain being provided with sloping side faces cooperative with the sloping faces of the pulley members, and a set of driving teeth carried by said chain and adapted to cooperatively engage with the pulley teeth in transmitting motion between the pulleys, said pulley teeth and chain teeth being formed to match for positive engagement with one another effected by the outward movement of the pulley teeth different distances.

15. A variable speed mechanism according to claim 12, characterized by the fact that means are provided acting on the pulley teeth and tending to yieldingly project the same for engagement with the chain teeth.

16. A variable speed mechanism as in claim 14, characterized by the fact that the pitch of the toothed chain is such relative to the number of teeth on each pulley that at least one of the teeth of each pulley will be engaged partially or wholly with its corresponding chain tooth at any of the different diameters to which the pulleys may be adjusted.

17. A variable speed mechanism as in claim 12, characterized by the fact that the teeth of the two sets are wedge-shaped, with the smaller ends of the teeth of one set facing the smaller ends of the teeth of the other set.

18. A variable speed mechanism as in claim 12, characterized by the fact that means are provided for automatically retracting the pulley teeth at or adjacent the point where the power transmitting chain disengages the pulley.

19. A variable speed mechanism as in claim 12, characterized by the fact that means are provided for automatically retracting the pulley teeth at or adjacent the point where the power transmitting chain disengages from the pulley, and means are provided for permitting the gradual projection of the retracted teeth at or adjacent the point where the transmitting chain engages with the teeth.

20. A variable speed mechanism as in claim 12, characterized by the fact that means are provided for retracting the movable pulley teeth, which means is of a form that will hold the teeth retracted until they arrive at or adjacent the point where the chain engages the pulley, and then will release the pulley teeth to permit their projection.

21. A variable speed mechanism as in claim 12, characterized by the fact that toothed retracting means are provided in the form of a fixed cam in position to be engaged by projections on the teeth, as the latter are carried around with the pulleys.

FRANK A. PESCHL.